Patented May 18, 1948

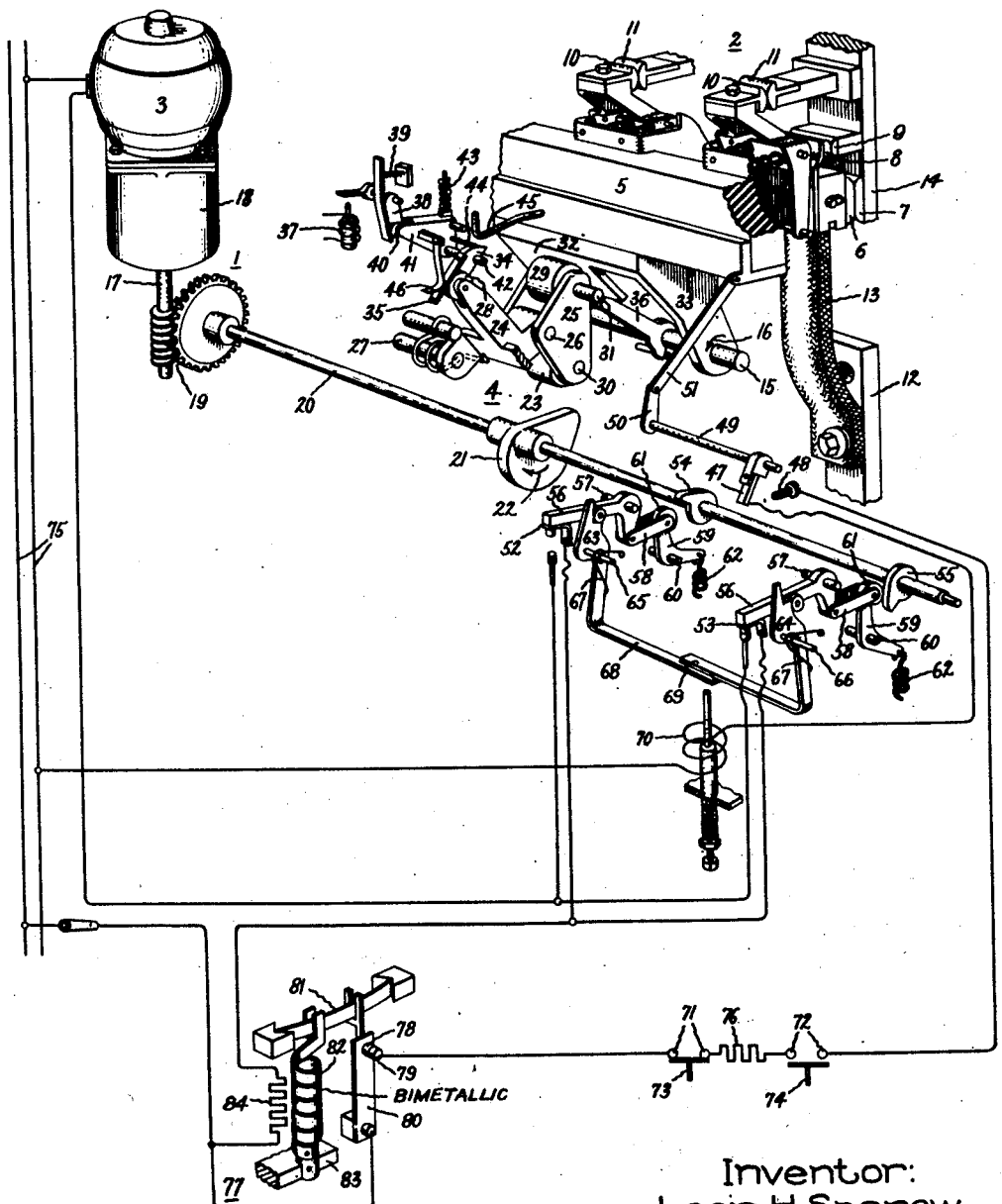

2,441,851

UNITED STATES PATENT OFFICE 2,441,851

MOTOR PROTECTIVE AND CONTROL ARRANGEMENT

Leon H. Sperow, Philadelphia, Pa., assignor to General Electric Company, a corporation of New York Application July 11, 1944, Serial No. 544,427

9 Claims. (Cl. 318—473)

My invention relates to improvements in motor protective and control arrangements and more specifically to improvements in control and protective arrangements of the type disclosed in United States Letters Patent 2,282,007, issued May 5, 1942.

In so-called low voltage alternating current network systems, it is customary to use a network protector which includes a circuit breaker and protective relay means for effecting the closing of the circuit breaker only when a predetermined relation exists between the relative magnitudes of and the phase angle between the voltage across the open circuit breaker and the voltage of the network. Usually the circuit breaker is actuated to the circuit closing position by a motor operated mechanism which for obvious reasons is preferably of a trip-free type. The energization of the motor is initiated by the series related contacts of the protective relays and an auxiliary switch which closes when the circuit breaker opens and opens when the circuit breaker closes.

In order to avoid uncertainties in the maintenance of the initiating circuit due to relay contact flutter and the difficulty of adjusting the circuit breaker auxiliary switch to conform to a definite position of the circuit breaker, sealing-in arrangements have been used for the motor energizing circuit so that coasting or over-running of the motor cannot prevent the completion of a single operation or interfere with the completion of successive operations. Thus, as disclosed in United States Letters Patent 2,282,007, a plurality of sealing-in contacts are connected in parallel in the energizing circuit of the motor and so operated that, regardless of coasting of the motor mechanism, at least one and possibly more of these contacts can be closed to effect the energization of the motor circuit in response to the intiating operation of the protective relays and the circuit breaker auxiliary switch.

Inasmuch as the operation of a network protector is more or less infrequent, the motors used are rated for intermittent duty as a matter of economy in space and cost. However, certain network system conditions effect repeated operations of the protective relays. Such operations and also failure of the latch mechanism of the protector cause pumping, that is repeated closing and tripping operations of the protector. With prolonged pumping, an intermittently rated motor is, in effect, working on a continuous basis and the inevitable burning of the motor occurs. In order to avoid this, it has been proposed to protect the motor by a thermal device having a thermal operating element controlling contacts which are connected in series in the motor energizing circuit. The major disadvantage of this arrangement is that the thermal device may operate to open the motor circuit at any time, thus stopping the motor at any point in the closing cycle. Consequently, it is possible for the network protector to stop in a partially closed position such that the secondary contacts are just touching and the primary contacts are open. Under this condition, the secondary contacts which are of limited current carrying capacity will quickly burn out.

An object of my invention is to provide for an electric motor, an improved protective and control arrangement for protecting the motor against overheating. Another object of my invention is to provide for a device operating mechanism, actuated by an intermittently rated electric motor, an improved thermal protective and control arrangement for protecting both the motor and the device in the event of too frequent operation of the motor. Still another object of my invention is to provide for a latched closed circuit breaker operating mechanism, actuated by an intermittently rated electric motor, an improved thermal protective and control arrangement which will prevent damage to the motor in the event the latching mechanism fails to function. A further object of my invention is to provide an improved protective and control arrangement for network protector control systems of the type disclosed in United States Letters Patent 2,282,007. These and other objects of my invention will appear in more detail hereinafter.

For a motor actuated device wherein one or more switches in the motor circuit are opened during motor actuation of the device and are held open but provided with means for effecting their closing, I provide in accordance with my invention thermal responsive means heated proportionately to the heating of the motor for preventing the closing of the motor circuit switch or switches to prevent overheating of the motor especially by too frequent operation in case of an intermittently rated motor.

My invention will be better understood from the following description when considered in connection with the accompanying drawing, and its scope will be pointed out in the appended claims.

For the purpose of illustrating my invention, I have shown an embodiment thereof as applied to the network protector control arrangement disclosed in United States Letters Patent 2,282,007. As shown, this arrangement comprises an operating mechanism 1 for effecting a predetermined travel of the movable element of an electric circuit breaker 2. The illustrated operating mechanism 1 comprises, in general, suitable actuating means such as an electric motor 3 and collapsible thrust transmitting means 4, which may be operatively related to the motor. The thrust transmitting structure is operatively connected to the movable element 5 of the circuit breaker. The particular structure so far described, and as illustrated, is disclosed in detail in United States Letters Patent 2,034,145, issued March 7, 1936. While I have chosen to illustrate a particular structure known to the art, it is to be understood that such structure is chosen merely for the purpose of illustrating my invention, the application of which is not limited to such structure.

The circuit breaker 2 comprises a plurality of pairs of cooperating main movable and stationary contacts 6 and 7, respectively, one pair for each phase of the circuit to be controlled. The contacts 6 are suitably mounted on the movable element 5. Each pole of the circuit breaker also includes a pair of relatively movable cooperating transfer or burning contacts 8 and 9 arranged in parallel with the main contacts 6 and 7. Besides these main and transfer contacts, suitable arcing contacts 10 and 11 and arc-extinguishing means, not shown, may be provided as will be obvious to those skilled in the art. As shown, the power circuit through the circuit breaker comprises a terminal member 12 for each phase, a flexible conductor 13 interconnecting the terminal 12 with the movable contact 6 of the corresponding phase, a stationary contact 7, and a terminal member 14. The movable member 5 is pivotally supported on a fixed shaft 15 so that separation of the circuit breaker contacts occurs as the movable member 5 is turned in the direction indicated by the arrow 16.

The operative relation between the motor 3 and the thrust transmitting structure 4 is effected through a shaft 17 connected to the motor 3 through a suitable braking mechanism which is housed in a casing 18, suitable speed reducing gearing 19, and a shaft 20 on which is mounted an actuating cam 21 coacting with the thrust transmitting structure 4. Energization of the motor 3 effects rotation of the actuating cam 21 in the direction indicated by the arrow 22 and a circuit closing operation of the circuit breaker 2 through engagement of the actuating cam 21 with a roller 23 on the thrust transmitting mechanism 4. Inasmuch as the braking mechanism enclosed in the housing 18 is fully disclosed in United States Letters Patent 2,034,145, supra, it is unnecessary to describe the structure further than to state that its function is to prevent overrunning or overtravel of the actuating cam except within relatively narrow limits so that the operating mechanism may be readily tripped, reset and reclosed, as necessary, without interference from the actuating cam 21. In general, the braking mechanism comprises a resilient connection between the motor shaft and the shaft 17 such that the braking effect is eliminated when the motor torque exceeds the torque of the resilient means employed and restored when it falls below this torque.

The thrust transmitting structure 4 is of the so-called trip-free type and is adapted to be reset and latched independently of the cam 21. As shown, the thrust transmitting structure comprises toggle members 24 and 25, which are pivotally interconnected at 26. The toggle member 24 is mounted on a fixed pivot 27 and carries at its free end a roller 28 which coacts with latching and tripping means hereinafter described. As shown, the toggle member 25 is a triangularly shaped link carrying the roller 23 and a roller 29. These rollers are pivotally mounted at 30 and 31, respectively, on opposite sides of the pivotal support 26. The roller 23 is arranged to be in the path of the actuating cam 21 when the circuit breaker is to be closed, and the roller 29 is arranged to engage an inclined actuating face 32 of a pivotally supported member 33 which carries the movable circuit breaker element 5. The supporting member 33, which is pivotally mounted on the shaft 15, is biased to its open circuit position both by gravity and a suitable resilient means, not shown.

The circuit breaker mechanism is illustrated in the circuit closing position with the toggle 24—25 overset so as to hold the element 5 in this position wherein the toggle is held by a pivoted latch member 34 which engages the roller 28. The latch 34 is provided with an extension 35 so as properly to position the latch with respect to the roller 28. When latched, the toggle is maintained in an overset thrust transmitting position because the reacting force of the circuit breaker is along the line of centers of the pins 26 and 31 and this line is slightly overset relatively to the fixed pivot 27. Accordingly, there is a clockwise movement acting on the link 24, which is restrained by the latch 34, so as rigidly to position the pivot 26. The inclined face 32 engaged by the roller 29 is normal to the plane of the axes of the pivots 26 and 31 so that the link 25 is in dead center position with respect to the toggle thrust. In order to avoid accidental movement of the link 25 about the pivot 26 by vibration so as to prevent collapse of the toggle and the opening of the circuit breaker, a prop 36 pivotally mounted on the shaft 15 is arranged to drop behind and brace the pivot pin 31.

The latch controlling and resetting means comprises an arrangement whereby a relatively small tripping force is effective to release a charged spring, or the like, for causing positive and quick release of the main latch 34. For this purpose, a trip coil 37 is arranged to coact with a pivoted latch 38 which is biased by a spring 39 so as normally to engage a roller 40 carried by a trigger member 41. This trigger member, which is copivotally mounted at 42 with the latch 34, is biased by a spring 43 for clockwise rotation. The applied force of the spring 43 is slightly off center relatively to the pivot 42 so that the spring force is available immediately to rotate the trigger member 41 clockwise upon releasing movement of the latch 38. A pin 44 carried by the trigger member 41 is so arranged that upon clockwise movement of this member the pin sharply strikes the latch 34 whereby to rotate the same clockwise to the toggle releasing position.

The resetting means for the latch and trigger arrangement described is such that immediately following the collapse of the main toggle 24—25 and the circuit opening movement of the element 5, the trigger 41 is reset and the latch 34 positioned so that it is in readiness to latch the main toggle when the roller 28 returns to its initial position. The trigger resetting means comprises a member 45 carried by the element 5 and arranged to engage the trigger 41 and rotate the same counterclockwise. The return of the trigger 41 to its initial position causes it to be engaged by the latch 38. The resetting operation of the circuit breaker element 5 also recharges the spring 43 by compressing it against a fixed stop, not shown. The positioning of the latch 34 for releasing the roller 28 of the main toggle is accomplished by means of a resilient connection such as a leaf spring 46 secured at one end to the trigger 41 and flexed so as to engage at its other end the latch 34 and bias it for counterclockwise rotation.

For controlling the closing operation of the circuit breaker 2, suitable switching means are provided, so arranged as to be closed when the circuit breaker is open and open when the circuit breaker is closed. As shown, this switching means comprises relatively movable cooperating contacts 47 and 48. For effecting movement of the contact 47, it is mounted on a shaft 49 which is connected to the movable member 5 by suitable means such as a crank 50 and a link 51 so as to partake of the movement of this member.

In order to prevent coasting or over-running of the motor 3 from so interfering with the sealing-in action as to prevent the completion of a single operation or to interfere with successive completed operations, there are provided two independently operable switches 52 and 53, each of which is arranged independently to control the energization of the motor 3. As shown, these switches are independently and separately operative in a predetermined sequence upon rotation of the cam shaft 20 by respectively associated cams 54 and 55. Each of the switches 52 and 53 comprises a movable member 56 pivoted as at 57 and in the form of a bell crank which is interconnected by links 58 to an operating crank 59, pivoted as at 60. The operating crank 59 is provided with a cam engaging roller 61 positioned in the path of movement of the respectively associated operating cams 54 and 55. Suitable biasing means such as a spring 62 is provided to insure the closing of and the desired contact pressure in switches 52 and 53. For holding the switches 52 and 53 in the circuit opening position, suitable latching means such as latching members 63 and 64 are provided. These are respectively pivoted as at 65 and 66, and each is suitably biased by a spring 67 for movement into the latching position which is shown for the switch 52. As illustrated, the latching means is so arranged that the tail 68 of the latch 63, which is the first to be opened by rotation of the cam shaft 20, underlies the tail 69 of the latch 64 of the other switch 53. This enables a more compact and simple construction of the sealing-in device embodying the parts just described.

For releasing the latches 63 and 64, there is provided electromagnetic means comprising a winding 70 which, when energized, is arranged first to hit the tail 68 of the latch 63 and move this slightly, then to engage the tail 69 of the latch 64 so that both latches may be given a fairly sharp blow in sequence without putting a double tripping load on the plunger of the tripping magnet. In the arrangement shown, as the cam shaft 20 rotates in the direction indicated by the arrow 22, the switch 52 is first opened and the latch 63 associated therewith is biased by its spring 67 into the latching position illustrated. At this time, the tail 68 of the latch 63 moves downward out of the way of the tail 69 of the latch 64 so that, when the switch 53 is subsequently opened, the latch 64 may rotate into the latching position from the bias of its spring 67. With this arrangement, it is preferable that the first switch 52 to be moved to the open position be the one the tail of whose latch underlies the tail of the latch of the other switch. If the ends of the latch tails do not overlap but are merely close enough together to be struck simultaneously by the armature when the latches are in the latching position, it is immaterial which switch is closed first.

From the foregoing, it will be obvious that inasmuch as the cams 54 and 55 rotate one in advance of the other, the switches 52 and 53 will be opened in sequence, but, regardless of where the cam shaft 20 stops, at least one of these switches cannot be restrained from closing the motor circuit since both latches will be moved from the restraining position when the latch releasing winding 70 is energized.

The circuit of the latch releasing winding 70 is controlled through the circuit breaker auxiliary switch contacts 47 and 48 and the contacts 71 and 72 of the power directional and phasing relays, indicated schematically by 73 and 74, usually associated with the closing control of low voltage alternating current network protectors. As is well known to the art, the power directional means operates to close its contacts when it is possible for power to flow from the feeder to the network. The phasing relay operates to close its contacts only when a predetermined relation exists between the values of the voltage across the circuit breaker and the voltage of the network.

As illustrated, the motor 3 is arranged to be connected to a source 75 in a circuit comprising one or both of the parallel connected switches 52 and 53. For controlling the closing of these switches by the latch releasing means, the winding 70 thereof is arranged to be connected to the source 75 in a circuit comprising the circuit breaker auxiliary switch 47—48, the contacts 71 and 72 of the network protector relays 73 and 74 in series, and a series resistance 76, if necessary. In accordance with my invention, I further control the closing of the switches 52 and 53 by thermal means 77 heated proportionately to the heating of the motor 3 for preventing the closing of the switches 52 and 53 when the motor 3 tends to overheat from too frequent operation in consequence of pumping and the like.

For the purpose of illustrating my invention, I have shown the thermal means 77 as of the self-resetting type disclosed in United States Letters Patent 2,088,443, dated July 27, 1937. As illustrated, this thermal means comprises contacts 78 and 79 in series in the circuit of the winding 70. One of these contacts 78 is mounted on a contact arm 80, which is arranged to be snapped to and from the closing position by an overcenter bow spring 81. For operating the bow spring, there is provided a helically wound bimetallic strip 82, the lower end of which is fixed to a rigid support 83 and the upper end of which is forked to engage the bow spring 81. For heating the bimetallic element 82 proportionately to the heating of the motor 3, there is provided a resistance 84 connected in series in the energizing circuit of the motor 3. Actually, this resistance 84 may be a helical element around the bimetallic element 82. However, for simplicity in illustration and understanding of the structure, I have schematically illustrated the resistance 84 at one side of the bimetallic element 82.

Assuming the parts positioned as shown, it will be apparent that the motor 3 has been energized to rotate the cam 21 in the direction indicated by the arrow 22 whereby to effect a closing operation of the circuit breaker 2. Also, the cam shaft has been rotated sufficiently for the cam 54 to have opened the switch 52, but not sufficiently for the cam 55 to open the switch 53. Accordingly, the circuit of the motor 3 is still completed through the switch 53 and the cam shaft 20 continues to rotate until the cam 55 effects the opening of the switch 53. After the opening of both of the switches 52 and 53, the motor may tend to coast under the braking action to which it is subjected, but no matter what the position of the cam shaft 20 when the motor stops, there is nothing to prevent the closing of at least one of the switches 52 and 53 in consequence of the energization of the closing winding 70.

Whenever the trip coil 37 of the circuit breaker 2 is energized to effect a release of the trigger 41 and thereby a spring tripping action of the latch 34 whereby to cause the collapse of the toggle 24—25 and the opening of the circuit breaker 2, the auxiliary switch 47—48 will be closed. The energizing of the trip coil 37 may be effected by the closing of the tripping contacts of a power directional relay which responds to cause the opening of the circuit breaker on the occurrence of a fault on the feeder supplying the network, as is well known to the art.

With the circuit breaker open and the auxiliary switch 47—48 closed, then whenever the network protective relays 73 and 74 act to complete the closing control circuit, the winding 70 which controls the closing operation of the switches 52 and 53 will be energized. As soon as this occurs, at least one and possibly both of these switches will be moved to the closing position depending upon the stopping position of the cam shaft 20. Upon the closing operation of one or both of these switches, the closing spring 62 of the switch maintains the switch in the closed position. The closing of at least one of the switches 52, 53 effects the energization of the motor 3 and thereby the rotation of the cam 21 which, as it engages the roller 23 of the circuit breaker mechanism 4, effects the closing operation of this mechanism which, as will be obvious from the description heretofore given, resets itself during the opening movement of the circuit breaker.

Inasmuch as system conditions may be such as to cause a frequently repeated opening and closing of the circuit breaker 2 and also since there is a possibility of failure of the latching mechanism of the circuit breaker, the motor 3, which is usually intermittently rated, may be subjected to duty beyond its capacity. However, in the event of such pumping operation, the bimetallic element 82 of the thermal device 77 will become heated proportionately to the heating of the motor by reason of the resistance 84 in the motor circuit. When such heating approaches the safe limit of the motor rating, the bow spring 81 will be pushed overcenter from the position shown in the drawing to open the contacts 78 and 79 and thereby prevent further operation of the motor 3 until such time as the thermal device 77 has cooled sufficiently to reverse the movement of the bow spring and cause the closing of the contacts 78 and 79. During such period, the motor will have had an opportunity to cool sufficiently to again be operated safely. With this arrangement, it will be apparent that the thermal device not only protects the motor against overheating, but it also prevents the motor from stopping in a position where the breaker contacts would be left in a partially closed position with, for example, the secondary contacts 8 and 9 just touching and the primary contacts 6 and 7 open, a condition which would seriously damage the circuit breaker since the secondary contacts are of limited current carrying capacity.

While I have shown and described my invention in considerable detail, I do not desire to be limited to the exact arrangements shown, but seek to cover in the appended claims all those modifications that fall within the true spirit and scope of my invention.

What I claim as new and desire to secure by Letters Patent of the United States, is:

1. In combination, an electric motor, a circuit for said motor, a switch for controlling said circuit, means biasing said switch to the circuit closed position, latching means for holding said switch in the circuit open position, electromagnetic means for releasing said latching means, and means for preventing the operation of said electromagnetic means when the motor tends to overheat from too frequent operation comprising thermal responsive means arranged to be heated proportionately to the heating of the motor.

2. In combination, a movable member, an electric motor for moving said member, a circuit for said motor, parallel connected switches in said circuit biased to the closed position, means controlled by said motor for sequentially opening said switches at different points in the path of movement of said member, means for maintaining said switches in the open position independently of the position of said member, means for releasing the holding action of said maintaining means to effect the closing of said switches, and means for preventing the operation of said releasing means when the motor tends to overheat from too frequent operation comprising thermal responsive means arranged to be heated proportionately to the heating of the motor.

3. In combination, a device to be actuated, an intermittently rated electric motor for actuating said device, a circuit for said motor, a switch in said circuit, means actuated by said motor for opening said switch, means for maintaining said switch open, means tending to close said switch, and means for preventing the operation of said closing means when the motor tends to overheat from too frequent operation comprising thermal responsive means arranged to be heated proportionately to the heating of the motor.

4. In an arrangement for actuating the movable circuit controlling member of a circuit breaker to the circuit closing position, an intermittently rated electric motor for actuating said member, a circuit for said motor, a biased to close switch in said circuit, means actuated by said motor during the circuit closing movement of said member for opening said switch, means for holding said switch in the open position against the bias thereon, electromagnetic means for releasing said holding means, and means for preventing the energization of said electromagnetic means when the motor tends to overheat from too frequent operation comprising thermal responsive means connected to be energized in dependence on the current flowing in the circuit of the motor.

5. In combination, an electric motor, a circuit for said motor, a biased to close switch in said circuit, means actuated by said motor for opening said switch, means for maintaining said switch open, means for releasing said maintaining means, and means for preventing the operation of said releasing means when the motor tends to overheat comprising thermal responsive means arranged to be heated proportionately to the heating of the motor.

6. In combination, a device to be operated to two positions, means for actuating said device from one of said positions to the other comprising an intermittently rated electric motor, and means for controlling the energization of said motor comprising two switches connected in parallel, means controlled by said motor for opening said switches sequentially after actuation of said device to said other position to effect de-energization of said motor, means for actuating said device from said other position to said one position, means for returning said switches to the circuit closing position when said device moves to said one position, and means for preventing the reclosing of said switches when the motor tends to overheat from too frequent operation comprising thermal responsive means arranged to be heated proportionately to the heating of the motor.

7. In combination, a movable member, an electric motor for moving said member, a circuit for said motor, parallel connected switches in said circuit, means controlled by said motor for sequentially opening said switches at different points in the path of movement of said member, means for maintaining said switches in the open position independently of the position of said member, means for closing said switches, and means for preventing the operation of said switch closing means when the motor tends to overheat from too frequent operation comprising thermal responsive means connected to be energized in dependence on the current in the circuit of the motor.

8. A protective arrangement for an electric motor arranged to operate a device intermittently comprising a switch for controlling the operation of said motor, means for operating said switch to start the operation of said motor, means for preventing said switch operating means from starting said motor comprising thermal responsive means arranged to be heated proportionately to the heating of the motor, and means dependent on the operation of said motor for maintaining the motor energized for a length of time sufficient to effect a desired operation of said device independently of the condition of said thermal means.

9. In an arrangement for actuating the movable circuit controlling member of a circuit breaker to the circuit closing position by an intermittently rated electric motor, a biased to close switch in the circuit of said motor, means actuated by said motor during the circuit closing movement of said member for opening said switch, means for latching said switch in the open position against the bias thereon, electromagnetic means operative when energized to release said latching means, and means for preventing the energization of said electromagnetic means when the motor tends to overheat from too frequent operation comprising contacts in the circuit of the winding of said electromagnetic means and self-resetting thermal responsive means for effecting the opening and the closing of said contacts connected to be energized in accordance with the current in the circuit of the motor.

LEON H. SPEROW.

REFERENCES CITED

The following references are of record in the file of this patent:

UNITED STATES PATENTS

| Number | Name | Date |
|---|---|---|
| 2,154,669 | De Loache | Apr. 18, 1939 |
| 2,264,982 | Johnson | Dec. 2, 1941 |
| 2,282,007 | Smith | May 5, 1942 |
| 2,338,515 | Johns | Jan. 4, 1944 |